C. H. BUCK.
POULTRY HOUSE ATTACHMENT.
APPLICATION FILED APR. 22, 1914.
1,202,477.
Patented Oct. 24, 1916.
2 SHEETS—SHEET 1.
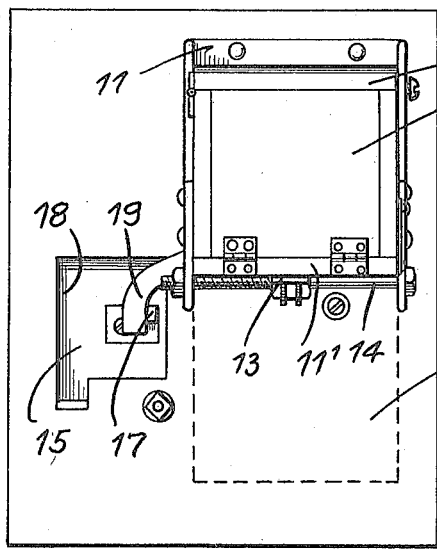
Fig. 1.
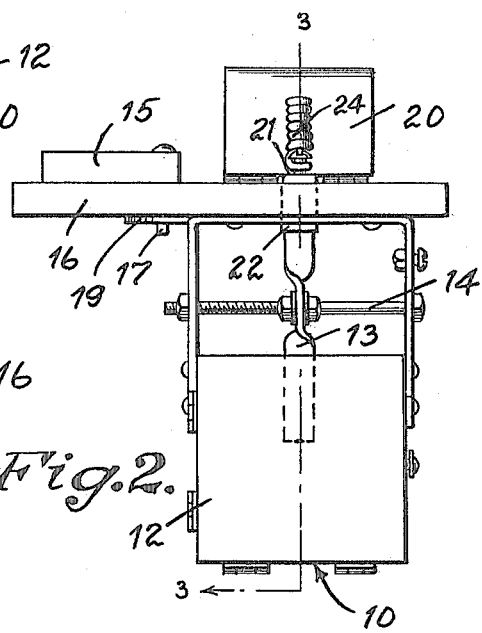
Fig. 2.
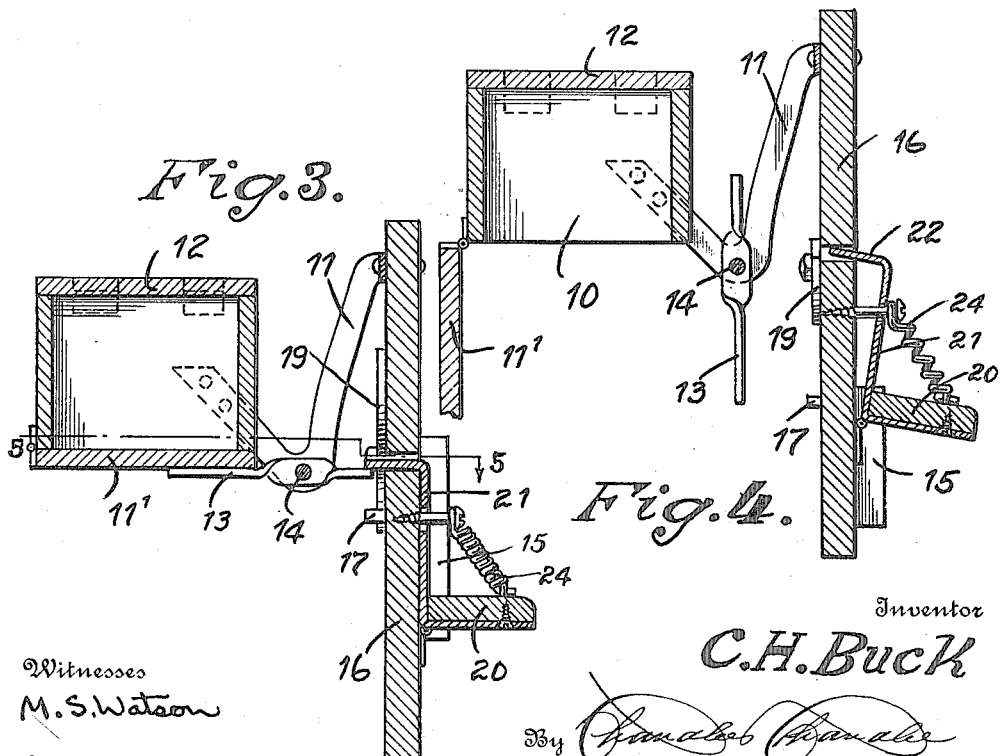
Fig. 3.
Fig. 4.
Witnesses
M. S. Watson
Francis Boyle
Inventor
C. H. Buck
By
Attorneys

C. H. BUCK.
POULTRY HOUSE ATTACHMENT.
APPLICATION FILED APR. 22, 1914.

1,202,477.

Patented Oct. 24, 1916.
2 SHEETS—SHEET 2.

Witnesses
M. S. Watson
Francis Boyle

Inventor
C. H. Buck
By
Attorneys

UNITED STATES PATENT OFFICE.

CHARLES H. BUCK, OF ROOSEVELT, ARIZONA.

POULTRY-HOUSE ATTACHMENT.

1,202,477.　　　　　Specification of Letters Patent.　　Patented Oct. 24, 1916.

Application filed April 22, 1914. Serial No. 833,716.

*To all whom it may concern:*

Be it known that I, CHARLES H. BUCK, a citizen of the United States, residing at Roosevelt, in the county of Gila, State of Arizona, have invented certain new and useful Improvements in Poultry-House Attachments; and I do hereby declare the following to be a full, clear, and exact description of the invention, such as will enable others skilled in the art to which it appertains to make and use the same.

This invention relates to poultry house attachments and has for an object to provide mechanism whereby the hens may be released and fed the first thing in the morning, such mechanism being controlled by the hens themselves, and requiring no manual attention except setting the mechanism in position to operate and filling the feed box at night.

A further object is to provide an extremely simple device of the above described type, which device may be constructed at a minimum cost, and will be formed of a few strong and durable parts that will not easily get out of order.

With the above objects in view the invention consists of certain novel details of construction and combination of parts hereinafter fully described and claimed, it being understood that various modifications may be made in the minor details of construction within the scope of the appended claim.

Figure 5:
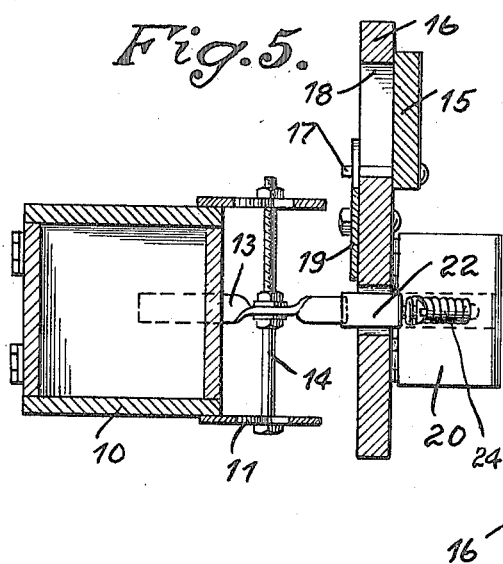
Figure 6:
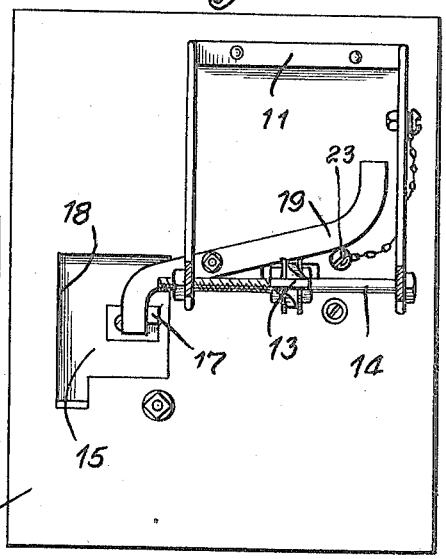
Figure 7:
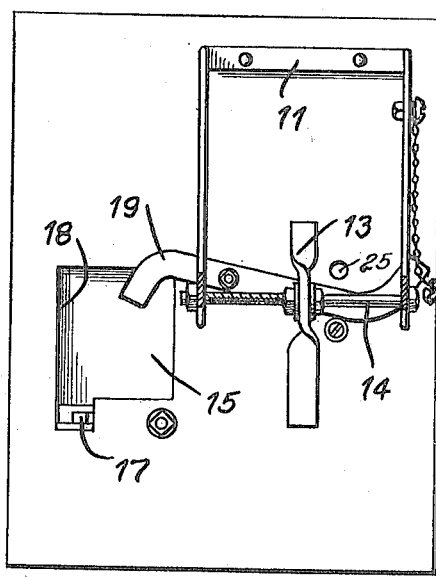
Figure 8:
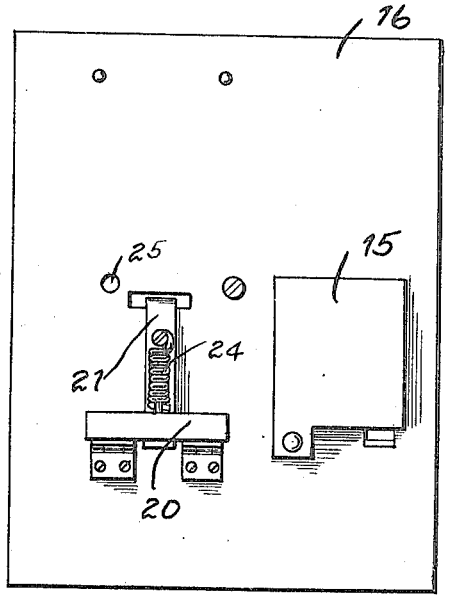

In the accompanying drawings illustrating this invention:—Figure 1 is a front elevation of the device. Fig. 2 is a plan view of the parts shown in Fig. 1. Fig. 3 is a vertical sectional view showing the platform controlled lever in position to hold the coop door closed and the feed box closed. Fig. 4 is a similar view showing the platform controlled lever tripped to open the coop door and open the feed box to discharge feed. Fig. 5 is a horizontal sectional view on line 5—5 of Fig. 3 showing the parts in plan that are illustrated in Fig. 3. Fig. 6 is a front elevation with the feed box removed and showing the gravitating lever in operative position to hold the door closed. Fig. 7 is a front elevation with the feed box removed showing the gravitating lever in position to release the door. Fig. 8 is a view in elevation showing the reverse side of the parts from that shown in Fig. 6.

The subject-matter of this invention includes several of the parts of a coop door opening device upon which Letters Patent were issued to me on April 22, 1913, No. 1059591. The parts shown in Figs. 7 to 8 inclusive of the accompanying drawings were included in the above referred to patent, and show mechanism operated by a hen stepping upon a platform to release the coop door which immediately gravitates to open position.

The present invention contemplates the addition of a feed box having a hinged bottom normally held closed by a lever which is controlled by the platform controlled means, whereby upon the platform being depressed by the weight of a hen, this lever will be released and permit of the bottom gravitating to discharge feed outside of the coop. Thus a single platform operates to simultaneously open the coop door to release the hens in the morning and to open the feed box to discharge the morning meal for the hens outside of the open coop door.

In carrying out my invention I provide a feed box 10 which is attached to the outside of the coop by means of an angular bracket 11, the feed box having a hinged top 12 to permit of the insertion of the feed, and further having a hinged bottom 11' which is normally open but which is held closed at night to retain the feed by means of a lever 13 that is centrally pivoted on a pin 14 carried by the bracket 11, and has a long end projecting underneath the door and a short end projecting toward the wall of the coop, the lever when in operative position to hold the door closed being in horizontal position, such position being maintained by mechanism which will be presently described and is included in the above referred to patented device. Upon the lever being released the long end gravitates and the lever assumes a vertical position with a resultant release of the feed box bottom which gravitates to open position and discharges the feed upon the ground.

The parts included in the above referred to patented device, and which are employed in connection with the feed box above described include a gravity door 15 that is pivoted at one lower corner to the inner wall of the coop 16 and carries a lug 17 that projects through the door opening 18. A counterbalanced lever 19 is arranged on the outer wall of the coop and has one end adapted to engage said lug to hold the door closed.

A platform 20 is hinged on the inner wall of the coop and carries an upright arm 21 having an outwardly bent terminal finger 22 which projects through an opening in the coop wall and is adapted to engage underneath the opposite end of the lever to hold the lever in operative position. Upon a hen stepping upon the platform, the platform is rocked downward with a resultant withdrawal of said finger from underneath said lever whereupon said lever gravitates and releases the door, the latter immediately gravitating to open position to release the hen.

For effecting the simultaneous opening of the feed box bottom upon the coop door opening, I engage the short end of the feed box door controlling lever 13 underneath the free end of the finger 22 when the latter is in operative position to hold the coop door closed. It is now evident that upon withdrawal of this finger to release the coop door, that the finger will pass off of the end of the lever 13 whereupon the latter is freed to gravitate as above described and release the feed box bottom.

In order to normally hold the platform 20 raised I provide a helical spring 24 which is secured to the platform and to the wall 16, this spring yielding readily to permit of the platform being depressed when a fowl steps upon it. In order to lock the door 15 closed to keep the poultry in during stormy weather, I provide a pin 23 as shown which may be inserted in an opening 25 in the wall to prevent tripping of the lever 19.

From the above description it will be seen that I have provided an extremely simple means that may be manually set at night to imprison the hens, and which is operated by the hens in the morning to release the hens from the coop and simultaneously deposit the morning meal outside of the open coop door. It will further be seen that the mechanism employed is formed from a few simple parts that may be made at a minimum cost and that are strong and durable and will not easily get out of order.

What is claimed is:—

The combination with a poultry house, of a door, a feed box having a movable bottom, means for normally holding said door and said bottom in closed position, including a lever on the house and a lever on the feed box, and a depressible platform having an arm adapted to hold both of said levers in operative position, said platform being operated by the weight of a hen thereon to move said arm to inoperative position with the resultant release of both of said levers and resultant movement of the door to open position and the bottom to open position.

In testimony whereof, I affix my signature, in the presence of two witnesses.

CHARLES H. BUCK.

Witnesses:
WM. BRUNSON,
J. H. MARTIN.